3,340,292
1,2,3,3a,4,6a - HEXAHYDRO - 1,2,4 - METHENOPEN-
TALENE-5,6-DICARBOXYLIC ACID AND LOWER
ALKYL ESTERS THEREOF
Charles Ferdinand Huebner, Chatham, N.J., assignor to
Ciba Corporation, New York, N.Y., a corporation of
Delaware
No Drawing. Filed May 6, 1964, Ser. No. 365,478
3 Claims. (Cl. 260—468)

The present invention relates to diesters of a polycyclic dicarboxylic acid, more especially to di-aliphatic esters of 1,2,3,3a,4,6a-hexahydro-1,2,4 - methenopentalene 5,6-dicarboxylic acid having the following formula

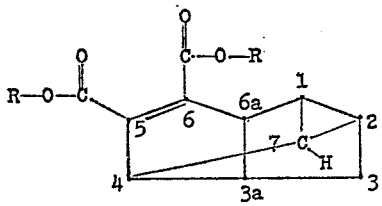

in which R is an aliphatic radical, primarily lower alkyl, and especially methyl, as well as ethyl, n-propyl, isopropyl, n-butyl and the like.

The compounds of the present invention are useful as plasticizers in the process of adding flexibility to plastic materials; they are used in lieu of other diesters of organic dicarboxylic acids having plasticizing effects, such as diesters of phthalic, adipic, sebacic, maleic, succinic acids and the like.

Furthermore, they are useful as intermediates in the preparation of other organic compounds. Thus, upon ammonolysis, for example, by treatment with concentrated ammonium hydroxide, ethanolic ammonia and the like, the esters of the present invention are converted into the 5,6-dicarbamyl-1,2,3,3a,4,6a - hexahydro - 1,2,4 - methenopentalene, which upon dehydration, for example, by treatment with phosphorus pentoxide, phosphorus oxychloride and the like, yields the known 5,6-dicyano-1,2,3, 3a,4,6a-hexahydro - 1,2,4-methenopentalene.

The compounds of the present invention are prepared by reacting 2,5-norbornadiene with a di-aliphatic ester of acetylene dicarboxylic acid in the absence of a diluent.

Preferred di-aliphatic esters of acetylene dicarboxylic acid are the di-lower alkyl acetylene dicarboxylates, particularly dimethyl acetylene dicarboxylate and the like.

Contrary to the known reaction of 2,5-norbornadiene with dicyanoacetylene, which is carried out in the presence of a diluent, for example, tetrahydrofuran and the like, the reaction of the same 2,5-norbornadiene starting material with a di-aliphatic ester of acetylene dicarboxylic acid, particularly with a di-lower alkyl acetylene dicarboxylate, does not occur in the presence of a diluent. It has been found, that the formation of the compounds of this invention is achieved by carrying out the reaction in the absence of a diluent.

Usually, the reaction is performed at an elevated temperature, preferably at about 100° to about 150°, and, if necessary, in the presence of an activator, such as a suitable Lewis acid, e.g. aluminum chloride, ferric chloride, stannic chloride and the like, and/or in the atmosphere of an inert gas, e.g. nitrogen.

Contrary to the known procedure of reacting 2,5-norbornadine with maleic acid anhydride at a temperature of more than 200°, which yields the anhydride of the 1,2,3,3a,4,5,6,6a - octahydro-1,2,4-methenopentalene 5,6-dicarboxylic acid in a small amount, the yields of the Diels-Alder procedure of this invention are satisfactory.

The compounds of this invention are also obtained by converting the cyano groups of the 5,6-dicyano-1,2,3,3a, 4,6a-hexahydro - 1,2,4 - methenopentalene into aliphatic esterified carboxyl groups.

The above reaction is carried out according to known methods, either by direct alcoholysis, for example, by treatment with an aliphatic alcohol, such as a lower alkanol, e.g. methanol, ethanol and the like, in the presence of an acid, e.g. sulfuric acid, hydrochloric acid and the like, or by hydrolysis of the starting material to the corresponding di-carboxylic acid, for example, by treatment with a concentrated solution of an acid, e.g. sulfuric acid and the like, or of a base, e.g. sodium hydroxide and the like, and esterification of the resulting 1,2,3,3a,4,6a-hexahydro-1,2,4-methenopentalene 5,6-dicarboxylic acid, for example, by treatment with an aliphatic alcohol, such as a lower alkanol, e.g. methanol, ethanol and the like, in the presence of an acid, e.g. sulfuric, hydrochloric acid and the like, reaction with an aliphatic diazo-compound, such as a lower diazoalkane, e.g. diazomethane, diazoethane and the like, or any other suitable esterification reagent.

The following example is intended to illustrate the invention and is not to be construed as being a limitation thereon. Temperatures are given in degrees centigrade.

Example

A mixture of 46.0 g. of 2,5-norbornadiene and 71.0 g. of dimethyl acetylene dicarboxylate is refluxed for twelve hours, and is then distilled. The desired dimethyl 1,2,3, 3a,4,6a - hexahydro - 1,2,4 - methenopentalene 5,6-dicarboxylate is recovered at 175–180°/20 mm. and crystallizes upon standing. It is recrystallized from ethanol and melts at 62–64°; yield: 56.0 g. or 48 percent of theory. A sample analyzes as follows:

Calcd. for $C_{13}H_{14}O_4$: C, 66.65; H, 6.02. Found: C, 66.40; H, 604.

By substituting in the above procedure other di-aliphatic esters, particularly di-lower alkyl esters of acetylene dicarboxylic acid, e.g. diethyl acetylene dicarboxylate, di-n-butyl acetylene dicarboxylate and the like, for the dimethyl acetylene dicarboxylate, and reacting these reagents with 2,5-norbornadiene, other di-aliphatic esters, particularly di-lower alkyl esters, of 1,2,3,3a,4,6a-hexahydro-1,2,4-methenopentalene 5,6-dicarboxylic acid, e.g. diethyl 1,2,3,3a,4,6a-hexahydro-1,2,4-methenopentalene 5, 6-dicarboxylate, di-n-butyl 1,2,3,3a,4,6a-hexahydro-1,2,4-methenopentalene 5,6-dicarboxylate and the like, are formed.

What is claimed is:
1. Di-lower alkyl 1,2,3,3a,4,6a-hexahydro - 1,2,4-methenopentalene 5,6-dicarboxylate.
2. Dimethyl 1,2,3,3a,4,6a-hexahydro - 1,2,4-methenopentalene 5,6-dicarboxylate.
3. 1,2,3,3a,4,6a-hexahydro - 1,2,4 - methenopentalene 5,6-dicarboxylic acid.

References Cited

UNITED STATES PATENTS 2,940,984   6/1960   Applequist et al. ____ 260—468

OTHER REFERENCES

Krespan et al., "J. Am. Chem. Soc.", vol. 83 (1961), pp. 3428–3432.
Weis, "J. Org. Chem.," vol. 28 (1963), pp. 74–78.

RICHARD K. JACKSON, *Primary Examiner.*